(12) United States Patent
Niggemann et al.

(10) Patent No.: US 8,158,698 B2
(45) Date of Patent: Apr. 17, 2012

(54) POWDER COATING COMPOSITION AND PROCESS OF MANUFACTURE

(75) Inventors: Frank Niggemann, Landshut (DE); Mike Schneider, Langenbach (DE); Phu Qui Nguyen, Moenchengladbach (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 78 days.

(21) Appl. No.: 12/840,540

(22) Filed: Jul. 21, 2010

(65) Prior Publication Data
US 2011/0172328 A1 Jul. 14, 2011

Related U.S. Application Data

(60) Provisional application No. 61/228,279, filed on Jul. 24, 2009.

(51) Int. Cl.
*C08J 3/20* (2006.01)

(52) U.S. Cl. ........................................ 523/351; 524/515

(58) Field of Classification Search .................. 523/351; 524/515
See application file for complete search history.

(56) References Cited

U.S. PATENT DOCUMENTS

| 2007/0225396 A1* | 9/2007 | Moens et al. | 522/104 |
| 2010/0311896 A1* | 12/2010 | Cavalieri et al. | 524/513 |

FOREIGN PATENT DOCUMENTS

| DE | 2633385 A1 | 1/1978 |
| JP | 2007169582 A | 7/2007 |
| WO | 2004041943 A1 | 5/2004 |

OTHER PUBLICATIONS

Bates, D.A., The Science of Powder Coatings, pp. 62-79, vols. 1&2, Gardiner House, London, 1990.

* cited by examiner

*Primary Examiner* — Edward Cain

(57) ABSTRACT

The present invention provides a powder coating composition comprising at least one glycidyl-functionalised (meth) acrylic resin, 1 to 30 wt %, the wt % based on the total weight of component A), of at least one hydroxyl-functionalised alkyl acrylate alkyl methacrylate copolymer, and at least one component selected from the group consisting of pigments, fillers, cross-linking agents and/or coating additives different from component B). The powder coating composition of this invention can provide coatings having improved impact resistance, corrosion stability, heat resistance and weather resistance. The powder coating also has good properties including good flow behavior and durability against aggressive substances, such as, inorganic acids.

9 Claims, No Drawings

_US 8,158,698 B2_

POWDER COATING COMPOSITION AND PROCESS OF MANUFACTURE

CROSS REFERENCE TO RELATED APPLICATION

This application claims the benefit of U.S. Provisional Application No. 61/228,279, filed Jul. 24, 2009 which is hereby incorporated by reference in its entirely.

FIELD OF THE INVENTION

The present invention is directed to a powder coating composition based on a glycidyl group containing (meth) acrylate resin as well as to a process of manufacture of the powder coating composition providing improved impact resistance of the coatings.

DESCRIPTION OF PRIOR ART

Powder coating compositions based on glycidyl group containing (meth) acrylate resins are well-known for the use in industrial applications. Due to their chemical composition they provide coatings having a good exterior durability as well as good gloss properties, but can provide coatings which are brittle and having weakness in flexibility and impact resistance.

To adjust the flexibility of the coatings it is known to add flexibility agents to the compositions, for example, polyurethane elastomers and so-called core-shell polymer particles. Core-shell polymer particles are particles having a polymer core and a polymer shell layer wherein the polymer of the core and the polymer of the shell layer may have different technical properties and may be bonded covalently. Compositions comprising such agents can lead to coatings with a loss in technological properties such as resistance to marring, staining and chemical attack.

Techniques to improve the impact elasticity of the coatings by modification of the molecular structure of the binder resin are time and cost consuming and did not lead to a successful result.

Therefore, providing improved impact resistance and flexibility of the coatings, based on glycidyl group containing (meth)acrylate resins, by keeping the superior technology properties of the coating is currently still a difficult task.

SUMMARY OF THE INVENTION

The present invention provides a powder coating composition comprising
  A) at least one glycidyl-functionalised (meth) acrylic resin,
  B) 1 to 30 wt %, the wt % based on the total weight of component A), of at least one hydroxyl-functionalised alkyl acrylate alkyl methacrylate copolymer, and
  C) at least one component selected from the group consisting of pigments, fillers, cross-linking agents and/or coating additives different from component B).

The powder coating composition of this invention comprising the at least one hydroxyl-functionalised alkyl acrylate alkyl methacrylate copolymer may provide coatings having a highly improved impact resistance, high corrosion stability and heat resistance, and, surprisingly, a high weather resistance (superdurability) according to the GSB (Gütegemeinschaft für die Stueckbeschichtung von Bauteilen) Class 3 standard (Class "Premium") based on ISO 2810 (Florida weathering test), by keeping the superior technology properties of the coating such as good flow behaviour and durability against aggressive substances, such as, inorganic acids. The composition of this invention makes it possible to use reduced amounts of the at least one hydroxyl-functionalised alkyl acrylate alkyl methacrylate copolymer compared to the usually used amounts of prior art flexibility agents in (meth) acrylic resin based coatings. The composition of this invention may have different gloss appearance in the range of high-gloss, gloss, semi-gloss to matt coatings, preferably high-gloss coatings.

DETAILED DESCRIPTION OF THE INVENTION

The features and advantages of the present invention will be more readily understood, by those of ordinary skill in the art, from reading the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

Slight variations above and below the stated ranges specified in this application can be used to achieve substantially the same results as values within the ranges. Also, the disclosure of these ranges is intended as a continuous range including every value between the minimum and maximum values.

The powder coating composition of this invention comprises at least one glycidyl-functionalised (meth) acrylic resin A) as the principal binder resin, with quantities in the range of, for example, 40 to 90 wt %, preferred 50 to 70 wt %, based on the total weight of the powder coating composition.

(Meth) acrylic is respectively intended to mean acrylic and/or methacrylic.

The glycidyl-functionalised (meth) acrylic resin of the invention may be produced in a conventional manner from glycidyl (meth) acrylic monomers, as is, for example, described in D. A. Bates, The Science of Powder Coatings, volumes 1 & 2, Gardiner House, London, 1990, pages 62-70, and as known by the person skilled in the art.

Examples of glycidyl-functionalised (meth) acrylic resins are glycidyl functionalised acrylic resins or copolymers therefrom, such as, for example, WorléeCryl® CP 550 (Worlee Chemie GbmH), ALMATEX® PD 7610, ALMATEX® PD 7690 (Siber Hegner GmbH), SYNTHACRYL® 710 (Cytec Surface Specialties), WYR 903 (DIC), FINE CLAD® A263B (DIC).

The glycidyl-functionalised (meth) acrylic resin may have an epoxide equivalent weight (EEW) in a range of 300 to 2000, epoxy equivalent weight determined by means of ADSAM142, a method code of the EEW test using autotritator (Brinkman Metrohm 751 GPD Titrino) and known by a person skilled in the art, and a glass transition temperature Tg in a range of, e.g., 30° C. to 80° C., preferably 40° C. to 70° C., Tg determined by means of differential scanning calorimetry (DSC) according to ISO 11357-2.

Preferred for this invention are glycidyl-functionalised (meth) acrylic resins with an EEW in the range of 400 to 800.

The glycidyl-functionalised (meth) acrylic resin of component A) may be at least one self cross-linkable resin having suitable functional groups within the resin structure which are able to crosslink with each other. Such functional groups may be, for example, hydroxyl, carboxyl and/or epoxy groups. The resin of component A) can also be at least one resin cross-linkable by external cross-linking with the functional groups of component B) and/or a cross-linking agent having suitable functional groups which are able to crosslink with the functional groups of the resin of component A). Such functional groups can be the groups as mentioned above and in the further description below.

The glycidyl-functionalised (meth) acrylic resin may be partially replaced by further resins such as, for example, diglycidyl ethers of bisphenol, epoxy novolak and other resins containing epoxy groups, in quantities in the range of lower than 10 wt %, based on the total weight of the powder coating composition A) to C).

The powder coating composition of this invention comprises at least one hydroxyl-functionalised alkyl acrylate alkyl methacrylate copolymer B), in a range of 1 to 30 wt %, preferably 3 to 20 wt %, the wt % based on the total weight of component A).

The hydroxyl-functionalised alkyl acrylate alkyl methacrylate copolymer is a copolymer that is formed by the polymerization of both alkyl acrylate monomers and alkyl methacrylate monomers and may have alkyl groups having 4-8 carbon atoms in the group. The hydroxyl value can be in the range of 50 to 300, preferably of 80 to 200.

The hydroxyl value is defined as the number of mg of potassium hydroxide (KOH) which is equal to the number of mg acetic acid for acetalizing of 1 g of the resin, determined according to DIN 53240.

The hydroxyl-functionalised alkyl acrylate alkyl methacrylate copolymer of the invention may be produced in a conventional manner known in the art.

The hydroxyl-functionalised alkyl acrylate alkyl methacrylate copolymer of the invention may have an average particle size in a range of 0.1 to 20 µm, particularly in the range of 0.1 to 10 µm.

The term average particle size mentioned in this document is based on and means the D90 value based on the standard mentioned below. The D90 value corresponds to a particle size below which 90 weight % of the particles lie, wherein the particle size analysis is done by a laser diffraction method and meets the standards set forth in ISO 13320-1. Measurements is done on a Malvern Mastersizer 2000.

The hydroxyl-functionalised alkyl acrylate alkyl methacrylate copolymer of component B) may be at least one self cross-linkable resin having suitable functional groups within the resin structure which are able to crosslink with each other. Such functional groups may be, for example, hydroxyl, carboxyl and/or epoxy groups. The resin of component B) can also be at least one resin cross-linkable by external cross-linking with the functional groups of component A) and/or a cross-linking agent having suitable functional groups which are able to crosslink with the functional groups of the resin of component B). Such functional groups can be the groups as mentioned above and in the further description below.

The powder coating composition according to the invention may contain as further component C) at least one component selected from the group consisting of pigments, fillers, cross-linking agents and/or coating additives. These components are constituents conventional in powder coating technology as known by a person skilled in the art.

Transparent, color-imparting and/or special effect-imparting pigments and/or fillers (extenders) can be used as component C). Suitable color-imparting pigments are any conventional coating pigments of an organic or inorganic nature providing the desired coating properties. Examples of inorganic or organic color-imparting pigments are titanium dioxide, micronized titanium dioxide, carbon black and phthalocyanine pigments. Examples of special effect-imparting pigments are metal pigments, for example, made from aluminum, copper or other metals, interference pigments, such as, metal oxide coated metal pigments and coated mica. Examples of usable extenders are silicon dioxide, aluminum silicate, barium sulfate, and calcium carbonate.

As cross-linking agent the powder coating composition of this invention may comprise one or more curing agent (cross-linking agent, hardener) containing, for example, carboxyl groups, for example, dicarboxylic and/or polycarboxylic acids and/or the anhydrides (polyanhydrides) thereof, hardeners containing amid or amino groups, for example, dicyandiamide and the derivatives thereof, carboxyl functionalised polyurethane resins, with quantities in the range of, for example, 0 to 40 wt %, preferred 0.1 to 30 wt %, based on the total weight of the powder coating composition.

The curing agents are known at a skilled person, see for example, D. A. Bates, The Science of Powder Coatings, volumes 1 & 2, Gardiner House, London, 1990, pages 71-79.

Coating additives of component C) are, for example, degassing auxiliaries, flow-control agents, flatting agents, texturing agents, fillers (extenders), photo-initiators, catalysts, dyes. Examples are flow-control agents incorporated in the composition according to the invention via an inorganic carrier or by master-batch techniques known by a person skilled in the art. Compounds having anti-microbial activity may also be added to the powder coating compositions.

The cross-linking reaction may be additionally accelerated by the presence in the powder coating composition according to the invention of catalysts known from thermal cross-linking. Such catalysts are, for example, tin salts, phosphides, amines and amides. They may be used, for example, in quantities of 0 to 5 wt %, based on the total weight of the powder coating composition.

The constituents of component C) are used in conventional amounts known to the person skilled in the art, for example, 0.05 to 60 wt %, preferably 0.1 to 50 wt %, based on the total weight of the powder coating composition.

The powder coating composition according to this invention may be prepared by conventional manufacturing techniques used in the powder coating industry, such as, extrusion and grinding processes, in general known by a person skilled in the art.

The powder coating composition according to this invention may be prepared by a process comprising the steps
a) mixing at least one part of component A) with component B) or mixing at least one part of component B) with component A), and
b) blending together with the further components of the composition.

Particularly, according to this invention, the powder coating composition can be prepared by mixing at least one part of the at least one hydroxyl-functionalised alkyl acrylate alkyl methacrylate copolymer with the at least one glycidyl-functionalised (meth) acrylic resin, or by mixing at least one part of the at least one glycidyl-functionalised (meth) acrylic resin with the at least one hydroxyl-functionalised alkyl acrylate alkyl methacrylate copolymer, prior blending together with the other components of the composition. For example, the hydroxyl-functionalised alkyl acrylate alkyl methacrylate copolymer can be dispersed into the glycidyl-functionalised (meth) acrylic resin, or vice versa, at ambient temperature, for example, 18 to 25° C. or at higher temperature, for example, up to 40° C., and this mixture can then be blended together with further components of the composition.

The blending with the further components can be done by dry-blending methods known in the art, and the mixture can be heated to a temperature to melt the mixture, and then the mixture is extruded as known in the art. The extruded material is then cooled on chill roles, broken up and ground to a fine powder, which can be classified to the desired grain size, for example, to an average particle size of 20 to 200 μm.

The composition according to the invention may also be prepared by spraying from supercritical solutions, NAD "non-aqueous dispersion" processes or ultrasonic standing wave atomization process.

Furthermore, specific components of the powder coating composition according to the invention, for example, the coating additives, for example also component B), the pigments and/or fillers, may be processed with the finished powder coating particles after extrusion and grinding by a "bonding" process using an impact fusion. For this purpose, the specific components may be mixed with the powder coating particles. During blending, the individual powder coating particles are treated to softening their surface so that the specific components adhere to them and are homogeneously bonded with the surface of the powder coating particles. The softening of the powder particles' surface may be done by heat treating the particles to a temperature, e.g., the glass transition temperature Tg of the composition, in a range, of e.g., 40° C. to 60° C., particularly 45° C. to 55° C. After cooling the mixture the desired particle size of the resulted particles may be proceed by a sieving process.

Therefore this invention refers also to a process of manufacture the powder coating composition of the invention.

The powder coating composition of this invention may be applied by, e.g., electrostatic spraying, thermal or flame spraying, or fluidized bed coating methods, also coil coating techniques, all of which are known to those skilled in the art.

The coating composition may be applied to, e.g., metallic substrates, non-metallic substrates, such as, paper, wood, plastics, glass and ceramics, as a one-coating system or as coating layer in a multi-layer film build.

In certain applications, the substrate to be coated may be pre-heated before the application of the powder composition, and then either heated after the application of the powder or not. For example, gas is commonly used for various heating steps, but other methods, e.g., microwaves, IR or NIR are also known.

The powder coating compositions according to the invention can be applied directly on the substrate surface or on a layer of a primer which can be a liquid or a powder based primer. The powder coating compositions according to the invention can also be applied as a coating layer of a multilayer coating system based on liquid or powder coats, for example, based on a powder or liquid clear coat layer applied onto a color-imparting and/or special effect-imparting base coat layer or a pigmented one-layer powder or liquid top coat applied onto a prior coating.

The applied and melted powder coating layer can be cured by thermal energy. The coating layer may, for example, be exposed by convective, gas and/or radiant heating, e.g., infra red (IR) and/or near infra red (NIR) irradiation, as known in the art, to temperatures of, e.g., 100° C. to 300° C., preferably of 140° C. to 250° C. (object temperature in each case).

The powder coating composition can also be cured by high energy radiation known by a skilled person. UV (ultraviolet) radiation or electron beam radiation may be used as high-energy radiation. UV-radiation is preferred. Irradiation may proceed continuously or discontinuously.

Dual curing may also be used. Dual curing means a curing method of the powder coating composition according to the invention where the applied composition can be cured, e.g., both by UV irradiation and by thermal curing methods known by a skilled person.

The present invention is further defined in the following Examples. It should be understood that these Examples are given by way of illustration only, and the present invention is not limited by the illustrative examples set forth herein below.

EXAMPLES

Example 1

Manufacture of a Powder Coating Composition of the Invention

A powder coating composition according to the invention (Formulation 1) is prepared according to the following ingredients:

TABLE 1

| Formulation 1 | Weight % |
| --- | --- |
| ALMATEX ® PD7690, Siber Hegner (glycidylfunctional acrylic resin, EEW: 510-550) | 51.02 |
| Alkyl acrylate alkyl methacrylate copolymer, Ganz Chemical (OH: 90-100, alkyl: 5-6 carbon atoms) | 2.50 |
| polyanhydride hardener | 18.88 |
| BYK ® 366 (flow agent) | 2.10 |
| Benzoin | 0.5 |
| Pigment | 25.00 |

The ingredients of the formulation was mixed and extruded in an extruder (firm: Buss AG) at 120° C. The melt-mixed formulation was cooled and the resulted material grinded to a D50 value of 40 μm particle size distribution. The term "D50 value" corresponds to a particle size below which 50 wt-% of the particles lie, wherein the particle size analysis is done by a laser diffraction method and meets the standards set forth in ISO 3310-1. The measurement is done on a Malvern Mastersizer 2000.

Example 2

Manufacture of a Powder Coating Compositions of Prior Art

A powder coating compositions of prior art (Formulation 2) was prepared according to the following ingredients:

TABLE 2

| Formulation 2 | Weight % |
| --- | --- |
| ALMATEX ® PD7690, Siber Hegner (glycidylfunctional acrylic resin, EEW: 510-560) | 49.20 |
| DYNAPOL ® S 1450, Evonik Degussa (flexibility agent) | 5.00 |
| polyanhydride hardener | 18.20 |
| BYK ® 366 (flow agent) | 2.1 |
| Benzoin | 0.5 |
| Pigment | 25.00 |

The ingredients of the formulation were processed in the same manner as described in Example 1.

Example 3

Application and Test of the Coatings

The final powder composition of each formulation was applied to a metal sheet by electrostatic spraying to a dry film thickness of 60-80 μm. Finally the coatings were cured in a convection oven at 160° C. for 20 minutes.

TABLE 3

| | Reverse Impact [inch pound] ASTM D 2794 | Gloss [60°/20°] DIN EN ISO 2813 | Erichsen-penetration [mm] DIN EN ISO 1520 | Cross cut |
|---|---|---|---|---|
| Formulation 1 | 30 | 89/80 | 5 | Gt0 |
| Formulation 2 | 0 | 88/76 | 5 | Gt0 |

Formulation 1 clearly shows improved properties on impact resistance and gloss of the coating.

What is claimed is:

1. A powder coating composition comprising
   A) at least one glycidyl-functionalised (meth) acrylic resin,
   B) 1 to 30 wt %, the wt % based on the total weight of the component A), of at least one hydroxyl-functionalised alkyl acrylate alkyl methacrylate copolymer additive, and
   C) at least one component selected from the group consisting of pigments, fillers, cross-linking agents and/or coating additives, different from component B).

2. The powder coating composition according to claim 1 wherein component A) is in a range of 40 to 90 wt % based on the total weight of the powder coating composition.

3. The powder coating composition according to claim 1 wherein component A) has an epoxy equivalent weight (EEW) in the range of 400 to 800.

4. The powder coating composition according to claim 1 wherein component B) has alkyl groups having 4-8 carbon atoms in the group.

5. The powder coating composition according to claim 1 wherein component B) has a hydroxyl value in the range of 80 to 200.

6. The powder coating composition according to claim 1 wherein component B) has an average particle size in a range of 0.1 to 10 μm.

7. The powder coating composition according to claim 1 wherein component C) is in the range of 0.05 to 60 wt % based on the total weight of the powder coating composition.

8. A process of manufacture the powder coating composition of claim 1 comprising the steps;
   a) mixing at least one part of component A) with component B) or mixing at least one part of component B) with component A), and
   b) blending together with the further components of the composition.

9. A substrate coated with the coating composition according to claim 1 and cured.

* * * * *